United States Patent
Yagasaki et al.

(10) Patent No.: US 8,477,837 B2
(45) Date of Patent: *Jul. 2, 2013

(54) VIDEO-INFORMATION ENCODING METHOD AND VIDEO-INFORMATION DECODING METHOD

(75) Inventors: Yoichi Yagasaki, Tokyo (JP); Osamu Sunohara, Tokyo (JP); Jun Murayama, Tokyo (JP)

(73) Assignee: Sony Corporation, Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 13/111,737

(22) Filed: May 19, 2011

(65) Prior Publication Data

US 2011/0222599 A1    Sep. 15, 2011

Related U.S. Application Data

(63) Continuation of application No. 12/879,411, filed on Sep. 10, 2010, which is a continuation of application No. 10/524,214, filed as application No. PCT/JP03/12969 on Oct. 9, 2003, now Pat. No. 7,796,690.

(30) Foreign Application Priority Data

Oct. 10, 2002  (JP) .................................. 2002-332901

(51) Int. Cl.
*H04N 7/12* (2006.01)
*G06K 9/36* (2006.01)
*H03M 7/00* (2006.01)

(52) U.S. Cl.
USPC ................. 375/240.01; 375/240.18; 382/247; 341/107

(58) Field of Classification Search
USPC .......... 375/240.01, 240.12; 341/107; 382/247
See application file for complete search history.

(56) References Cited

U.S. PATENT DOCUMENTS

4,891,643 A * 1/1990 Mitchell et al. ............... 341/107
5,469,212 A   11/1995 Lee
(Continued)

FOREIGN PATENT DOCUMENTS

CA   2 435 933 A1   8/2002
JP   2 248179      10/1990
(Continued)

OTHER PUBLICATIONS

Rabbani, M et al: "An overview of the JPEG 2000 still image compression standard" Signal Processing: Image Communication, Elsevier Science Publishers. vol. 17, No. 1, pp. 3-48, Jan. 2002.

(Continued)

*Primary Examiner* — Gims Philippe
(74) *Attorney, Agent, or Firm* — Oblon, Spivak, McClelland, Maier & Neustadt, L.L.P.

(57) ABSTRACT

A video-information encoding apparatus and decoding apparatus with a guarantee of a fixed processing time. By limiting the amount of data to be input into/output from a CABAC encoding unit and decoding unit on a unit-of-encoding basis, such as one picture, slice, macroblock or block, and by encoding uncompressed video data, it is possible to provide a video-information encoding apparatus and decoding apparatus with a guarantee of a fixed processing time. Thereby, an apparatus with a guarantee of the processing time can be mounted.

4 Claims, 15 Drawing Sheets

CONSTRUCTION OF VIDEO-INFORMATION ENCODING APPARATUS ACCORDING TO THIS INVENTION

U.S. PATENT DOCUMENTS

| | | | |
|---|---|---|---|
| 5,654,702 | A | 8/1997 | Ran |
| 5,867,600 | A * | 2/1999 | Hongu .................. 382/247 |
| 6,256,415 | B1 | 7/2001 | Ratnakar |
| 6,825,782 | B2 * | 11/2004 | Bossen .................. 341/107 |
| 6,856,701 | B2 | 2/2005 | Karczewicz et al. |
| 6,906,647 | B2 * | 6/2005 | Bossen .................. 341/107 |
| 7,336,720 | B2 * | 2/2008 | Martemyanov et al. . 375/240.12 |
| 7,454,071 | B2 | 11/2008 | Howard |
| 7,512,179 | B2 | 3/2009 | Sanson et al. |
| 7,796,690 | B2 | 9/2010 | Yagasaki et al. |
| 2001/0046263 | A1 | 11/2001 | Yamada et al. |
| 2003/0156651 | A1 | 8/2003 | Streater et al. |
| 2004/0021592 | A1 | 2/2004 | Karczewicz |
| 2004/0151247 | A1 | 8/2004 | Sanson et al. |
| 2010/0329331 | A1 | 12/2010 | Yagasaki et al. |
| 2010/0329351 | A1 | 12/2010 | Yagasaki et al. |
| 2011/0007818 | A1 | 1/2011 | Yagasaki et al. |
| 2011/0044387 | A1 | 2/2011 | Yagasaki et al. |

FOREIGN PATENT DOCUMENTS

| | | | |
|---|---|---|---|
| JP | 09-009261 | | 1/1997 |
| JP | 10-108184 | | 4/1998 |
| JP | 10-191343 | | 7/1998 |
| JP | 10-256917 | A | 9/1998 |
| JP | 2000-13794 | | 1/2000 |
| JP | 2001-230935 | A | 8/2001 |
| WO | WO 01/86962 | A1 | 11/2001 |
| WO | WO 02/05561 | A1 | 1/2002 |

OTHER PUBLICATIONS

Satoru Adachi, et al., "Improvement of H.26L Arithmetic Coding using Spatial Context of Adjacent Blocks", Proceedings of the 2002 IEICE General Conference. The Institute of Electronics, Information and Communication Engineers, SD-3-17, Mar. 27, 2002, 1 front page, pp. 405-406.

Office Action issued Oct. 28, 2010 in Japanese Patent Application No. 2007-241628 (with English translation).

Office Action issued Jun. 12, 2012 in Japanese Patent Application No. 2010-290300.

U.S. Appl. No. 13/111,668, filed May 19, 2011, Yagasaki, et al.

U.S. Appl. No. 13/111,682, filed May 19, 2011, Yagasaki, et al.

U.S. Appl. No. 13/111,709, filed May 19, 2011, Yagasaki, et al.

U.S. Appl. No. 13/111,726, filed May 19, 2011, Yagasaki, et al.

Singapore Examination Report and Search Report issued Dec. 16, 2011, in Patent Application No. 201007685-9, filed Oct. 9, 2003.

European Search Report issued Nov. 27, 2012, in European Patent Application No. 12181632.6.

European Search Report issued Nov. 27, 2012, in European Patent Application No. 12181633.4.

European Search Report issued Nov. 27, 2012, in European Patent Application No. 12181638.3.

European Search Report issued Nov. 27, 2012, in European Patent Application No. 12181640.9.

European Search Report issued Jan. 22, 2013, in European Patent Application No. 12181629.2.

European Search Report issued Jan. 22, 2013, in European Patent Application No. 12184203.3.

Extended European Search Report issued Jan. 28, 2013, in Patent Application No. 12181630.0.

Extended European Search Report issued Jan. 28, 2013, in Patent Application No. 12181634.2.

Extended European Search Report issued Feb. 12, 2013, in Patent Application No. 12181643.3.

Extended European Search Report issued Feb. 15, 2013, in Patent Application No. 12184197.7.

* cited by examiner

FIG. 1 CONSTRUCTION OF VIDEO-INFORMATION ENCODING APPARATUS ACCORDING TO THIS INVENTION

FIG. 2 CONSTRUCTION OF VIDEO-INFORMATION ENCODING APPARATUS ACCORDING TO THIS INVENTION

FIG. 3  CONSTRUCTION OF VIDEO-INFORMATION ENCODING APPARATUS ACCORDING TO THIS INVENTION

FIG. 4  CONSTRUCTION OF VIDEO-INFORMATION ENCODING APPARATUS ACCORDING TO THIS INVENTION

FIG. 5 CONSTRUCTION OF VIDEO-INFORMATION ENCODING APPARATUS ACCORDING TO THIS INVENTION

FIG. 6  CONSTRUCTION OF VIDEO DECODING APPARATUS ACCORDING TO THIS INVENTION

FIG. 7 CONSTRUCTION OF MACROBLOCK PROCESSING UNIT

FIG. 8 CONSTRUCTION OF CONVENTIONAL VIDEO-INFORMATION ENCODING APPARATUS

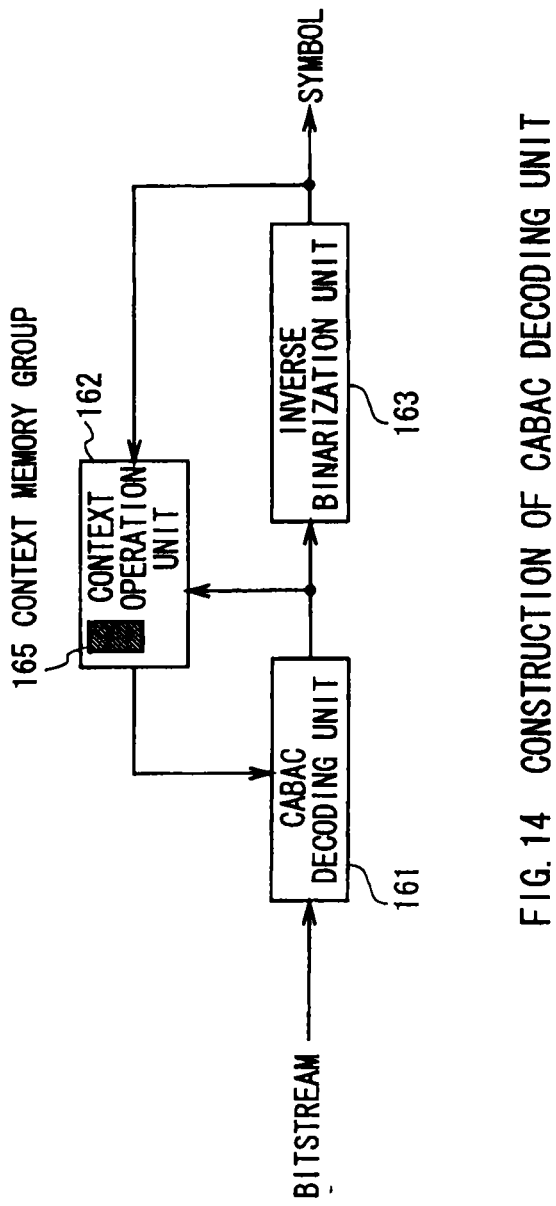
FIG. 14 CONSTRUCTION OF CABAC DECODING UNIT

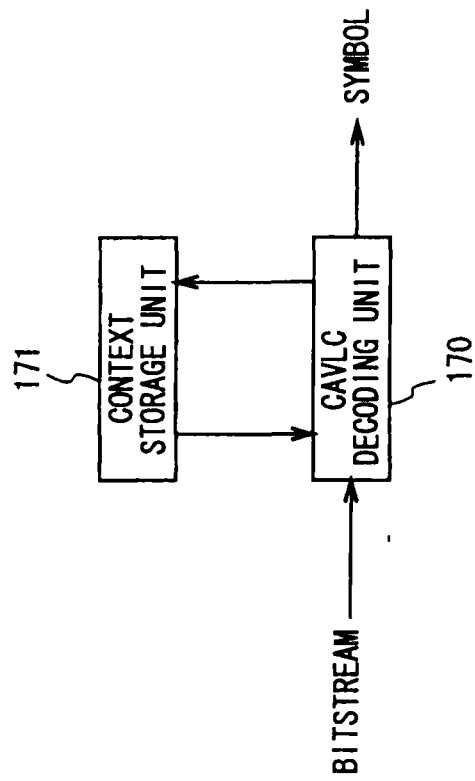
FIG. 15  CONSTRUCTION OF CAVLC DECODING UNIT

VIDEO-INFORMATION ENCODING METHOD AND VIDEO-INFORMATION DECODING METHOD

CROSS REFERENCE TO RELATED APPLICATIONS

This application is a continuation application of U.S. application Ser. No. 12/879,411, filed on Sep. 10, 2010, which is a continuation of U.S. application Ser. No. 10/524,214, filed on Feb. 10, 2005, now U.S. Pat. No. 7,796,690, issued on Sep. 14, 2010. This application is based upon and claims the benefit of priority to International Application No. PCT/JP03/12969, filed on Oct. 9, 2003 and from the prior Japanese Patent Application No. 2002-332901 filed on Oct. 10, 2002. The entire contents of each of these documents are incorporated herein by reference.

BACKGROUND OF THE INVENTION

Summary of the Invention

The present invention, like recently developed standard JVT (ITU-T Rec. H. 264|ISO/IEC 14496-10 AVC), relates to a method, apparatus, and program for encoding video information, and a method, apparatus, and program for decoding video information used when video information (bitstream) is received through a network medium such as satellite broadcasting, a cable TV or the Internet or when video information is processed on a storage medium such as an optical disc, a magnetic disk or a flash memory, the video information compressed through orthogonal transformation such as discrete cosine transform or the Karhunen Loeve transform, and motion compensation.

Discussion of the Background

Recently, for both of broadcasting stations providing information and homes receiving the information, it has become common to use devices that adopt a method such as MPEG to compress video information through orthogonal transformation such as discrete cosine transform, and motion compensation, utilizing the redundancy of the video information, for efficient information transmission and storage, by taking the video information as digital information.

Especially, the MPEG2 (ISO/IEC 13818-2) is defined as a general video encoding method, and is widely used as an application for professionals and for consumers since it can treat interlaced images and progressively scanned images, and standard resolution video and high resolution video. By using the MPEG2 compression method, a high compression rate and high quality of video can be realized, for example, by assigning interlaced images of standard resolution of 720×480 pixels a bit rate of 4 to 8 Mbps, or by assigning progressively scanned images of high resolution of 1920×1088 pixels a bit rate of 18 to 22 Mbps.

The MPEG2 mainly encodes high quality video for broadcasting and does not cope with a bit rate lower than that used by the MPEG1, that is, an encoding method with a high compression rate. However, it was expected that popularization of mobile terminals would bring high needs of such an encoding method, and therefore the MPEG4 encoding system was standardized. As to a video encoding method, its standard was approved as international standard ISO/IEC 14496-2 in December 1998.

In addition, recently, with video encoding for video conferencing as a first desired usage, a method called JVT (ITU-T Rec. H.264|ISO/IEC 14496-10 AVC) is being standardized. Compared with conventional encoding systems such as MPEG2 and MPEG4, it is known that the JVT can provide higher encoding efficiency although it requires more operations for encoding and decoding.

FIG. 8 shows a general construction of a video-information encoding apparatus that realizes video compression with orthogonal transformation such as the discrete cosine transform or the Karhunen Loeve transform, and motion compensation. As shown in FIG. 8, a video-information encoding apparatus 100 is composed of an A/D converter 101, a screen rearrangement buffer 102, an adder 103, an orthogonal transformation unit 104, a quantization unit 105, a reverse encoding unit 106, a storage buffer 107, a dequantization unit 108, an inverse orthogonal transformation unit 109, a frame memory 110, a motion prediction/compensation unit 111, and a rate control unit 112.

Referring to FIG. 8, the A/D converter 101 converts an input video signal into a digital signal. The screen rearrangement buffer 102 rearranges the frames according to the GOP (Group of Pictures) of video compression information given from the A/D converter 101. The screen rearrangement buffer 102 gives the orthogonal transformation unit 104 video information on the entire frames of images to be intra-encoded (within image encoded). The orthogonal transformation unit 104 applies an orthogonal transformation, such as the discrete cosine transform or the Karhunen Loeve transform, to the video information and gives a transform coefficient to the quantization unit 105. The quantization unit 105 performs a quantization process on the transform coefficient given from the orthogonal transformation unit 104.

The reverse encoding unit 106 determines an encoding mode based on the quantized transform coefficient, which was supplied by the quantization unit 105, and a quantization scale, and applies variable-length coding or reverse encoding such as arithmetic coding to the encoding mode to thereby create information to be inserted in the header part in each unit of encoded video. The encoded encoding mode is given and stored into the storage buffer 107. This encoded encoding mode is output as video compression information.

In addition, the reverse encoding unit 106 applies variable-length coding or reverse encoding, such as arithmetic coding, to the quantized transform coefficient and gives the encoded transform coefficient to the storage buffer 107 to store it therein. This encoded transform coefficient is output as video compression information.

The quantization unit 105 operates under the control of the rate control unit 112. The quantization unit 105 gives the quantized transform coefficient to the dequantization unit 108, which performs dequantization on the transform coefficient. The inverse orthogonal transformation unit 109 creates decoding video information by applying an inverse orthogonal transformation process to the dequantized transform coefficient, and gives the information to the frame memory 110 to store it therein.

On the other hand, the screen rearrangement buffer 102 gives the motion prediction/compensation unit 111 video information on an image to be inter-encoded (between images encoded). The motion prediction/compensation unit 111 retrieves video information used for reference simultaneously from the frame memory 110 and performs a motion prediction/compensation process to create reference video information. The motion prediction/compensation unit 111 gives the reference video information to the adder 103, which then converts the reference video information into a differential signal from the video information. At the same time, the motion prediction/compensation unit 111 gives motion vector information to the reverse encoding unit 106.

The reverse encoding unit 106 determines an encoding mode based on the quantized transform coefficient, which was given from the quantization unit 105, the quantization scale, the motion vector information given from the motion prediction/compensation unit 111, etc., and applies variable-length coding or reverse encoding such as arithmetic coding to the encoding mode, to thereby create information to be inserted into the header in a unit of encoded video. The encoded encoding mode is given to the storage buffer 107 to be stored therein. The encoded encoding mode is output as video compression information.

The reverse encoding unit 106 applies variable-length coding or the reverse encoding process such as arithmetic coding to the motion vector information to create information to be inserted in the header part in a unit of encoded video.

In the inter-encoding, video information to be input into the orthogonal transformation unit 104 is a differential signal obtained by the adder 103, which is different from the intra-encoding. Since other processes are the same as in the case of the video compression information to be intra-encoded, its explanation will be omitted.

Next, FIG. 9 shows a general construction of a video-information decoding apparatus corresponding to the aforementioned video-information encoding apparatus 100. As shown in FIG. 9, the video information decoding apparatus 120 is composed of a storage buffer 121, a reverse decoding unit 122, a dequantization unit 123, an inverse orthogonal transformation unit 124, an adder 125, a screen rearrangement buffer 126, a D/A converter 127, a motion prediction/compensation unit 128, and a frame memory 129.

The storage buffer 121 temporarily stores input video compression information, and then transfers the information to the reverse decoding unit 122. The reverse decoding unit 122 applies variable-length decoding or a process such as arithmetic decoding to the video compression information based on the prescribed format of the video compression information, obtains the encoding mode information from its header part, and gives the information to the dequantization unit 123. Similarly, the reverse decoding unit 122 obtains the quantized transform coefficient and gives it to the dequantization unit 123. In a case in which the frame has been subjected to the inter-encoding, the reverse decoding unit 122 decodes motion vector information stored in the header part of the video compression information as well, and gives the information to the motion prediction/compensation unit 128.

The dequantization unit 123 dequantizes the quantized transform coefficient supplied from the reverse decoding unit 122, and gives the transform coefficient to the inverse orthogonal transformation unit 124. The inverse orthogonal transformation unit 124 applies inverse orthogonal transformation, such as inverse discrete cosine transform or inverse Karhunen Loeve transform, to the transform coefficient based on the prescribed format of the video compression information.

In a case in which the frame has been subjected to the intra-encoding, on the other hand, the video information subjected to the inverse orthogonal transformation is stored in the screen rearrangement buffer 126, and then is output after a D/A conversion process by the D/A converter 127.

In a case in which the frame has been subjected to the inter-encoding, the motion prediction/compensation unit 128 creates a reference image based on the motion vector information subjected to the reverse decoding and the video information stored in the frame memory 129, and gives the image to the adder 125. The adder 125 adds this reference image and the output of the inverse orthogonal transformation unit 124. Since other processes are performed in the same way to the case of the frame subjected to the intra-encoding, its explanation will be omitted.

Now, the reverse encoding unit 106 under the JVT will be described in detail. As shown in FIG. 10, the reverse encoding unit 106 under the JVT adopts one reverse encoding out of arithmetic coding called CABAC (Context-based Adaptive Binary Arithmetic Coding) and variable-length coding called CAVLC (Context-based Adaptive Variable Length Coding), for a symbol such as mode information, motion information, and quantized coefficient information, which are input from the quantization unit 105 and the motion prediction/compensation unit 111, and outputs video compression information (bitstream). Based on CABAC/CAVLC selection information in FIG. 10, it is judged which reverse encoding is used. This CABAC/CAVLC selection information is determined by the video-information encoding apparatus 100 and is output by being embedded in a bitstream as header information.

First the CABAC system in the reverse encoding unit 106 is shown in FIG. 11. As shown in FIG. 11, mode information, motion information, and quantized transform coefficient information input from the quantization unit 105 and the motion prediction/compensation unit 111 are input into a binarization unit 131 as multi-valued symbols. The binarization unit 131 converts the multi-valued symbols into a binary symbol string of an arbitrary length under a predetermined rule. This binary symbol string is input into a CABAC encoding unit 133, and the CABAC encoding unit 133 applies binary symbol arithmetic coding to the input binary symbols, and outputs the encoded resultant as a bitstream to the storage buffer 107. A Context operation unit 132 calculates Context based on the symbol information input to the binarization unit 131 and the binary symbols output from the binarization unit 131, and inputs the Context to the CABAC encoding unit 133. A Context memory group 135 of the Context operation unit 132 stores Context which is updated, as occasion arises, during an encoding process, and the initial state of Context to be used for a reset.

Next, the CAVLC system in the reverse encoding unit 106 is shown in FIG. 12. As shown in FIG. 12, mode information, motion information, and quantized transform coefficient information input from the quantization unit 105 and the motion prediction/compensation unit 111 are input in a CAVLC encoding unit 140 as multi-valued symbols. Like the variable-length coding adopted by the conventional MPEG, the CAVLC encoding unit 140 applies a variable-length coding table to the input multi-valued symbols, and outputs a bitstream. A Context storage unit 141 stores information already encoded in the CAVLC encoding unit 140, for example, the number of coefficients of non-zero in blocks already processed as well as in blocks being processed, the value of a coefficient encoded immediately before this time, and so on. The CAVLC encoding unit 140 is able to change a variable-length coding table to be applied for symbols, based on information from the Context storage unit 141. It should be noted that the Context storage unit 141 stores the initial state of Context to be used for a reset as well. The output bitstream is input into the storage buffer 107.

Similarly, the reverse decoding unit 122 under the JVT will be described in detail. Similarly to the reverse encoding unit 106, the reverse decoding unit 122 under the JVT applies one reverse decoding out of CABAC and CAVLC to an input bitstream, as shown in FIG. 13. By reading the CABAC/CAVLC selection information embedded in the header information of the input bitstream, one of CABAC and CAVLC is applied.

FIG. 14 shows the CABAC system in the reverse decoding unit 122. In FIG. 14, a CABAC decoding unit 161 applies binary symbol arithmetic decoding to a bitstream input from the storage buffer 121, and outputs the resultant as a string of binary symbols. This string of binary symbols is input into an inverse binarization unit 163, and the inverse binarization unit 163 converts the string of binary symbols into multi-valued symbols under a predetermined rule. The multi-valued symbols to be output from the inverse binarization unit 163 are output from the inverse binarization unit 163 to the dequantization unit 123 and the motion prediction/compensation unit 128 as mode information, motion vector, and quantized coefficient information. A Context operation unit 162 calculates Context based on the string of binary symbols input into the inverse binarization unit 163 and the multi-valued symbol output from the inverse binarization unit 163, and inputs the Context into the CABAC decoding unit 161. A Context memory group 165 of the Context operation unit 162 stores Context which is updated, as occasion arises, during a decoding process, and the initial state of Context to be used for a reset.

Next, the CAVLC system in the reverse decoding unit 122 is shown in FIG. 15. As shown in FIG. 15, an input bitstream from the storage buffer 121 is input into a CAVLC decoding unit 170. Like variable-length decoding adopted by the conventional MPEG, the CAVLC decoding unit 170 adopts a variable-length decoding table for the input bitstream and outputs mode information, motion information, and quantized transform coefficient information. These output information are input into the dequantization unit 123 and the motion prediction/compensation unit 128. A Context storage unit 171 stores information already decoded in the CAVLC decoding unit 170, for example, the number of coefficients of non-zero in blocks already processed as well as blocks being processed, the value of a coefficient decoded just before this time, and so on. The CAVLC decoding unit 170 is able to change the variable-length decoding table to be applied for symbols, based on information from the Context storage unit 171. It should be noted that the Context storage unit 171 stores the initial state of Context to be used for a reset as well.

For specific operations of the CABAC shown in FIG. 11 and FIG. 14, an explanation about the CABAC is written in Final Committee Draft ISO/IEO 14496-10:2002 (section 9.2), the entire contents of which are hereby incorporated herein by reference.

SUMMARY OF THE INVENTION

The applicants of the present invention have recognized certain drawbacks in the existing encoding and decoding systems, and improvements that can be made therein, as now discussed.

When 1 picture is encoded in a video-information encoding apparatus 100, even any of 1 picture, slice, macroblock and block is considered as a unit of encoding, the number of symbols, included in the unit of encoding, to be entered into the binarization unit 131 of FIG. 11 is not fixed since it depends on a video signal to be entered and encoding conditions.

In addition, the length of a binary data string to be output for one symbol entered into the binarization unit 131 is unfixed as described in section 9.2.1 of JVT FCD. For example, as is clear from Table 9-20 in section 9.2.1.5 of JVT FCD, the length of a binary data string for mb_type1 Symbol in I slice is 1 at a minimum (at the time of Intra_4×4), and is 6 at a maximum. Therefore, the length of binary data output from the binarization unit 131 in response to one Symbol is also unfixed.

For the above reasons, the number of pieces of binary data output from the binarization unit 131 in response to a symbol, included in a unit of encoding, of an input video signal is unfixed, and therefore a large amount of binary data may be possibly output from the binarization unit 131, due to the input data and encoding conditions.

The binary data output from the binarization unit 131 is input into the CABAC encoding unit 133. However, since the CABAC encoding unit 133 actually needs a processing time longer than one clock to process one piece of input binary data, if a great number of pieces of binary data are input into the CABAC encoding unit 133, a large processing time is accordingly required. In addition, as described above, as the number of pieces of binary data input into the CABAC encoding unit 133 is unfixed, the longest time for processing cannot be estimated.

Therefore, in a case in which the video-information encoding apparatus 100 should have a guarantee of real-time processing and a fixed processing speed, it can not have the guarantee if a great number of pieces of binary data is input into the CABAC encoding unit 133 or the number of pieces of binary data is unfixed.

In addition, a bit length output from the CABAC encoding unit 133 in response to a binary data string output from the binarization unit 131 in response to one symbol is unfixed. This is because the CABAC controls the output bit length according to the occurrence probability of input binary data. As a result, one piece of binary data input into the CABAC encoding unit 133 may be bitstream data of one bit or lower, or bitstream data of several bits, depending on its occurrence probability.

Since the CABAC encoding unit 133 actually needs a processing time longer than one clock cycle to process one piece of bit data to be output, if a large number of pieces of bit data are output from the CABAC encoding unit 133, a long processing time is required and, accordingly, as a result a mounted encoding unit needs a large processing time. In addition, as stated above, since the number of pieces of bit data output from the CABAC encoding unit 133 is unfixed, it is difficult to estimate the longest time for processing.

Therefore, in a case in which the video-information encoding apparatus 100 should have a guarantee of real-time processing and a fixed processing time, it can not have the guarantee if a large number of pieces of bit data are output from the CABAC encoding unit 133 or the number of pieces of bit data is unfixed.

The matter in that the number of pieces of binary data or bit data to be input to/output from the CABAC encoding unit 133 is unfixed in a unit of encoding, such as 1 picture, slice of a picture, macroblock, or a block, and may became large prevents the guarantee of a fixed processing time in the unit of encoding.

Further, when 1 picture is decoded in the video-information decoding apparatus 120, even any of 1 picture, slice, macroblock, and block is considered as a unit of decoding, the number of bits of a bitstream, included in the unit of encoding, entered into the CABAC decoding unit 161 is unfixed because it depends on an input bitstream.

Since the CABAC decoding unit 161 requires a processing time longer than one clock cycle to process one piece of input bit data, if a great number of pieces of bit data are input into the CABAC decoding unit 161, a large processing time is accordingly required. In addition, as stated above, since the number of pieces of bit data input into the CABAC decoding unit 161 is unfixed, the slowest processing speed can not be estimated.

Therefore, in a case in which the video-information decoding apparatus 120 should have a guarantee of real-time processing and a fixed processing time, it can not have the guarantee if a large number of pieces of bit data are input into the CABAC decoding apparatus 161 or the number of pieces of bit data is unfixed. Especially, as compared with the video-information encoding apparatus 100, in the video-information decoding apparatus 120, the real-time decoding and display of video information are highly demanded. Therefore, the fact that real-time processing can not be guaranteed is a problem.

Accordingly, one object of the present invention is to address the above-problem. In the present invention, considering the above problems, the amount of data to be input to/output from a CABAC encoding unit and decoding unit is limited in a unit of encoding such as 1 picture, slice, macroblock or block, and a mechanism for the limitation is applied to a video-information encoding apparatus and decoding apparatus, and its bitstreams.

Further, in the present invention, considering the above problems, uncompressed video data is encoded and a mechanism for the encoding is applied to a video-information encoding apparatus and decoding apparatus, and its bitstreams.

Still further, in the present invention, considering the above problems, the same method is applied to CAVLC as well as CABAC.

By limiting the amount of data to be input to/output from the aforementioned CABAC encoding unit and decoding unit and encoding uncompressed data, a video-information encoding apparatus and decoding apparatus can have a guarantee of a fixed processing time, and an apparatus with a guarantee of the processing time can be realized. In addition, similar effects can be obtained in CAVLC as well as CABAC.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 14 shows an example of a construction of a CABAC decoding unit in background JVT; and FIG. 15 shows an example of a construction of a CAVLC decoding unit in background JVT.

DESCRIPTION OF THE PREFERRED EMBODIMENTS

Figure 1:
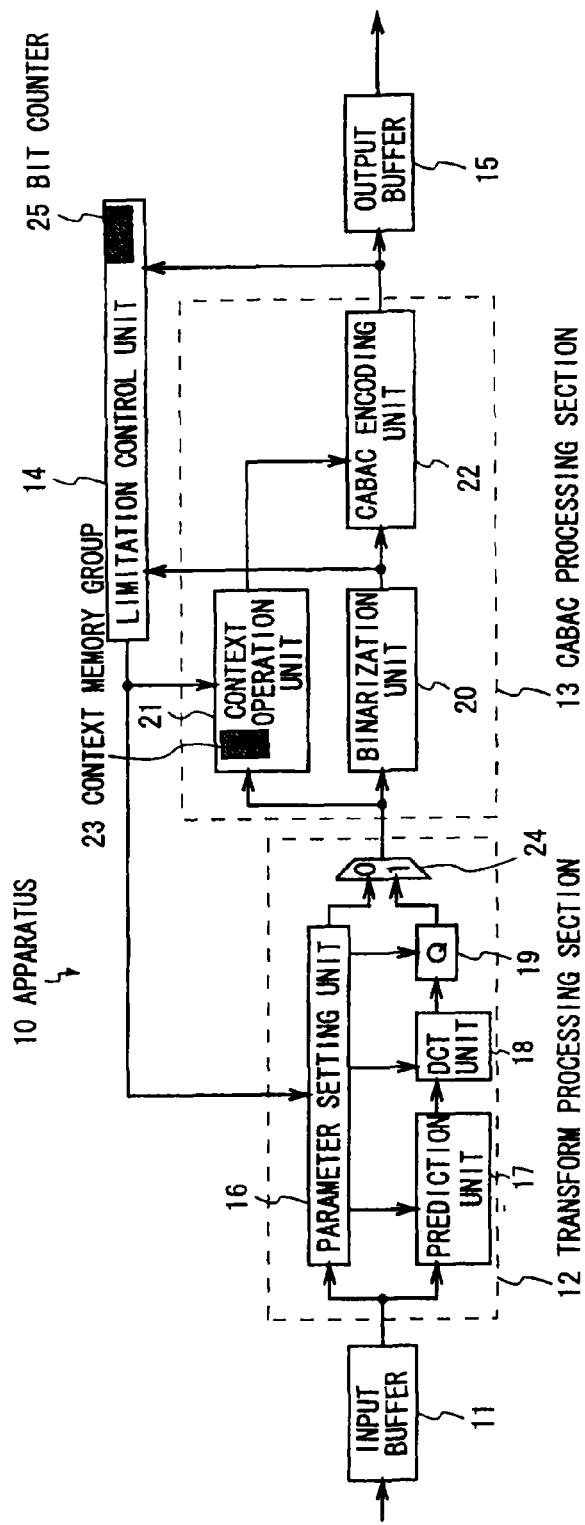
FIG. 1 shows an example of a construction of a video-information encoding apparatus of the present invention.

Embodiments of the present invention will be explained with reference to the attached drawings hereinafter, in which like reference numerals indicate identical or similar elements throughout.

FIG. 1 shows an embodiment of a video encoding apparatus 10 in the present invention. In the apparatus 10 of FIG. 1, video signals to be encoded are input, and an encoded bitstream is output. The apparatus 10 is composed of an input buffer 11, a transform processing section 12, a CABAC processing section 13, a limitation control unit 14, and an output buffer 15. The input buffer 11 partitions input video into macroblocks and outputs a macroblock, and when the processing of the macroblock is finished at the latter stage, outputs a next macroblock. The transform processing section 12 processes an input macroblock image, and outputs header information and quantized coefficient information to the CABAC processing section 13. Specifically, a parameter setting unit 16 sets header information such as mode information and motion vector information of a macroblock, and a quantization parameter, and outputs the value (symbol) to a prediction unit 17, a DCT unit 18, a quantization unit 19, and the CABAC processing section 13. The parameter setting unit 16 can set and output header information of a slice and picture, as well as header information of a macroblock, and these information are referred to as header information altogether. Also, a motion compensation in the prediction unit 17, a DCT transform in the DCT unit 18, and a quantization process in the quantization unit 19 are applied to input signals from their former stages by reference to an input signal from the parameter setting unit 16.

In the CABAC processing section 13, header information and quantized coefficient information are input as symbol data, subjected to arithmetic coding, and output as bit data. Specifically, the input symbol data is transformed into a binary data string by a binarization unit 20, and the binary data is entropy-coded by a CABAC encoding unit 22 based on Context information from a Context operation unit 21. The Context operation unit 21 updates Context based on the symbol data input into the binarization unit 20 and the binary data output from the binarization unit 20, and also outputs the Context information to the CABAC encoding unit 22.

The limitation control unit 14 has a first counter for the number of pieces of binary data input into the CABAC encoding unit 22 and a second counter for the number of pieces of output bit data (bit counter 25). The limitation control unit 14 increases the first counter by one every time a binary data is input into the CABAC encoding unit 22, and increases the second counter by one every time a bit data is output from the CABAC encoding unit 22. These counters reset to 0 every time the processing of the beginning of the macroblock starts. Thereby, the numbers of pieces of input data and output data in/from the CABAC encoding unit 22 can be counted.

Figure 11:
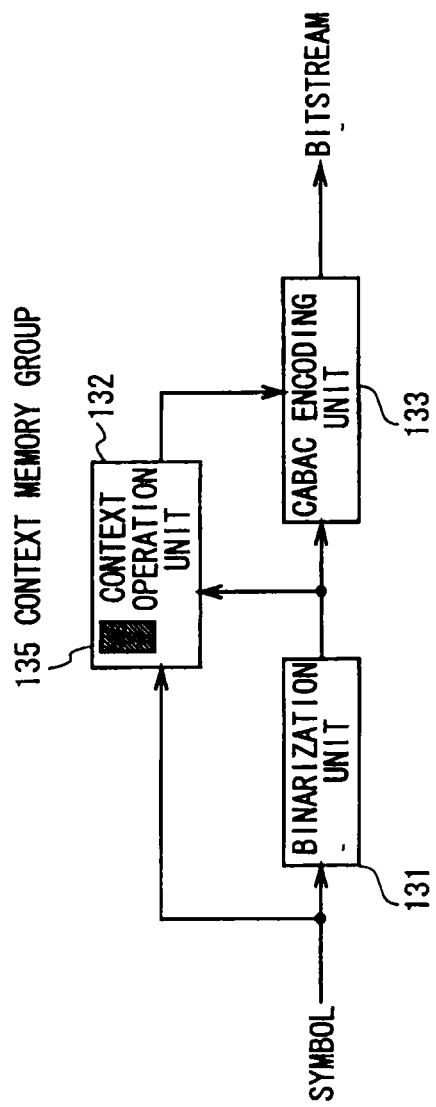
FIG. 11 shows an example of a construction of a CABAC encoding unit in background JVT.

When one or both of these counters shows a number exceeding a preset threshold value, the limitation control unit 14 outputs a signal (hereinafter referred to as a "reencoding signal") indicating that the data to be encoded is invalid, to the output buffer 15, the Context operation unit 21, and the parameter setting unit 16. The parameter setting unit 16 which received the reencoding signal resets an encoding parameter so as not to exceed the threshold value, and performs a reencoding process on macroblock data to be encoded. In addition, the Context operation unit 21 has a Context memory group 23, and this Context memory group 23 stores Context which is updated, as required, during an encoding process and the initial state of Context which is used for a reset, as in the Context memory group 135 shown in FIG. 11 as a background art, and also can store the state of Context just before the data processing of a macroblock. Therefore, the Context operation unit 21 which received a reencoding signal rewrites the state of Context being stored, to the value of Context stored in the memory newly added, thereby making it possible to restore the state of Context just before the update performed based on macroblock data to be encoded. In addition, the output buffer 15 which received the reencoding signal deletes all of bit data of a macroblock to be encoded and stored internally, and waits for an input of macroblock data encoded with a new encoding parameter. In addition, if any counter of the limitation control unit 14 does not show a value exceeding the preset threshold value when the encoding process of a target macroblock finishes, the bit data of the target macroblock in the output buffer 15 can be output as a bitstream.

In the apparatus 10 of FIG. 1 described above, reset of the counters of the limitation control unit 14 at the beginning of a macroblock means that the number of pieces of binary data to be input to the CABAC encoding unit 22 and the number of pieces of bit data to be output are monitored and limited on a macroblock basis, and by setting timing for this reset on a block basis in a macroblock, the number of pieces of data can be monitored and limited on a block basis. Similarly, by performing a reset on a slice basis, the number of pieces of data can be monitored and limited on a slice basis, and by performing a reset on a picture basis, the number of pieces of data can be monitored and limited on a picture basis. When a unit for managing and limiting the number of pieces of data is changed, the Context memory group 23 of the Context operation unit 21 stores a Context value in a unit of encoding just before the change at the same time, and therefore the state in the unit of encoding just before the change is restored as the state of Context. In addition, bit data of the output buffer 15 is also deleted every unit of encoding.

Also, restoration to a predetermined initial value, which is stored in the Context memory group 23, can be also performed, not to the Context value in the unit of encoding just before the change, which is stored in the Context memory group 23.

In the apparatus 10 of FIG. 1 described so far, although the limitation control unit 14 has two counters, threshold values set in these counters can be independently set to various values, only a data count of one of these two counters can be monitored and a data count of the other can be ignored, or the limitation control unit 14 can be constructed without counters.

In this apparatus 10, the maximum amount of data to be input into/output from the CABAC encoding unit can be limited for one time macroblock processing, which allows the requested time for one time processing of macroblock to be used satisfactorily. In addition, a bitstream to be decoded within a requested processing time can be output.

Figure 7:
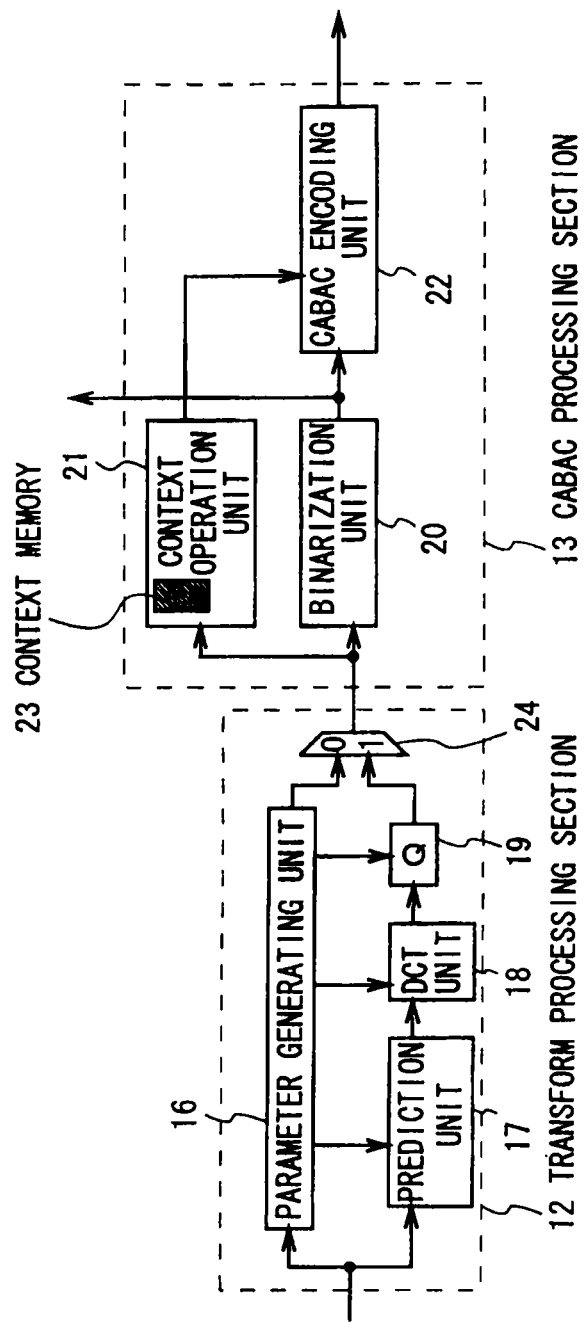
FIG. 7 shows an example of a construction of macroblock processing unit of the present invention.

Now, FIG. 7 shows a unit, a macroblock processing unit, representing the transform processing section 12 and the CABAC processing section 13 of FIG. 1, for the following description. The macroblock processing unit described below performs the same process as a unit in which the transform processing unit 12 and the CABAC processing unit 13 of FIG. 1 are connected in parallel.

In the apparatus 10 shown in FIG. 1, the transform processing section 12 has to set a new encoding parameter and encode a target macroblock every time the limitation control unit 14 outputs a reencoding signal, and further the counters of the limitation control unit 14 may exceed a threshold value repeatedly, due to data obtained by a re-set parameter. In this case, the encoding processes are successively performed on one macroblock several times, which takes a long time to encode 1 picture.

Figure 2:
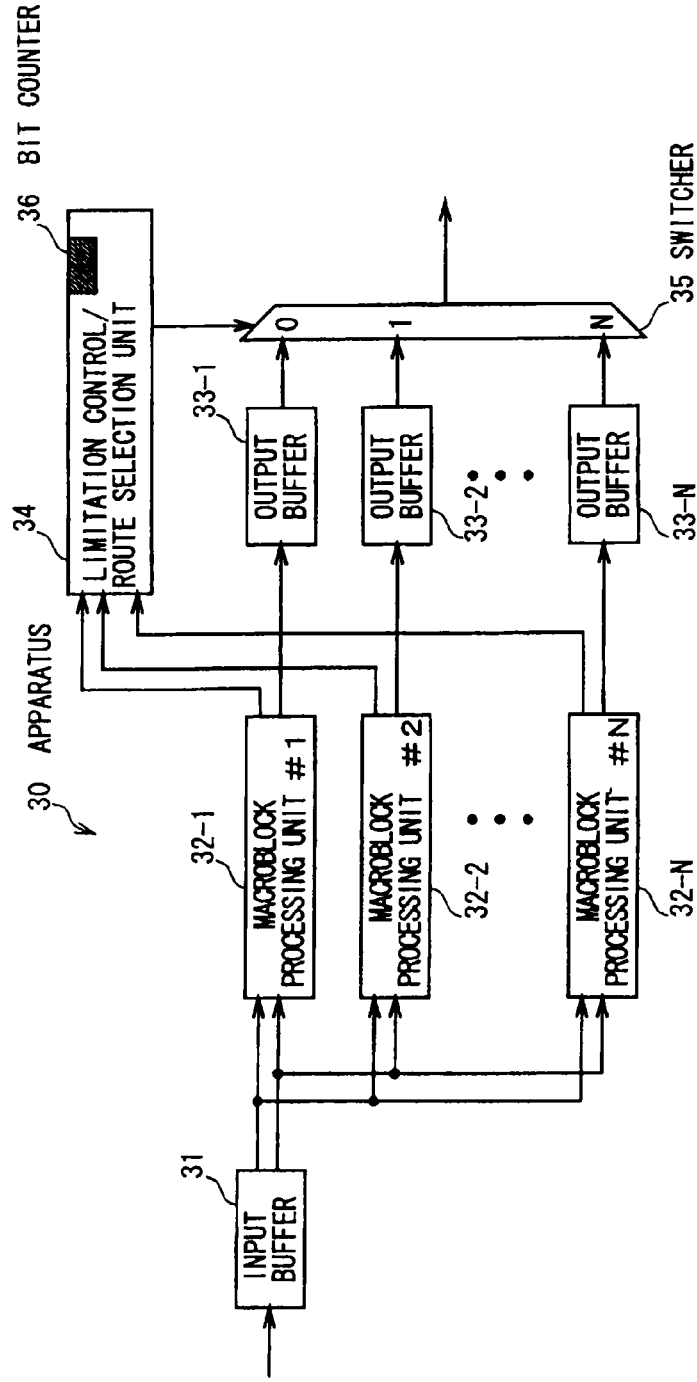
FIG. 2 shows an example of a construction of a video-information encoding apparatus of the present invention.

As another embodiment of a video encoding apparatus in the present invention, an example in which a target macroblock is encoded in parallel with different parameters is shown in FIG. 2 as a second embodiment.

In an apparatus 30 of FIG. 2, similarly to the apparatus 10 of FIG. 1, video signals to be encoded are input and an encoded bitstream is output. The apparatus 30 of FIG. 2 is composed of an input buffer 31, macroblock processing units 32-1 to 32-N capable of performing parallel encoding processes at N stages with N different encoding parameters, corresponding output buffers 33-1 to 33-N, a limitation control/route selection unit 34, and a switcher 35.

In the apparatus 30 of FIG. 2, N different encoding parameters are set for a macroblock to be encoded, and the encoding processes with these encoding parameters are performed in parallel by the macroblock processing units 32-1 to 32-N, and their outputs are stored in the output buffers 33-1 to 33-N.

The limitation control/route selection unit 34 has two input/output data counters (bit counter 36) for the CABAC encoding unit corresponding to the macroblock processing units 32-1 to 32-N, and selects an encoding route which does not make its counter exceed a threshold value and therefore is the most efficient encoding route, out of the N parallel routes, and selects a line for output from the switcher 35.

The detailed operation of the apparatus 30 of FIG. 2 and variations of a unit of encoding are the same as the apparatus 10 of FIG. 1.

In this apparatus 30, the maximum amount of data to be input into/output from the CABAC encoder at the time of encoding can be limited, so that the requested encoding processing time can be used satisfactorily. In addition, a bitstream that can be decoded within a requested processing time can be output.

Figure 3:
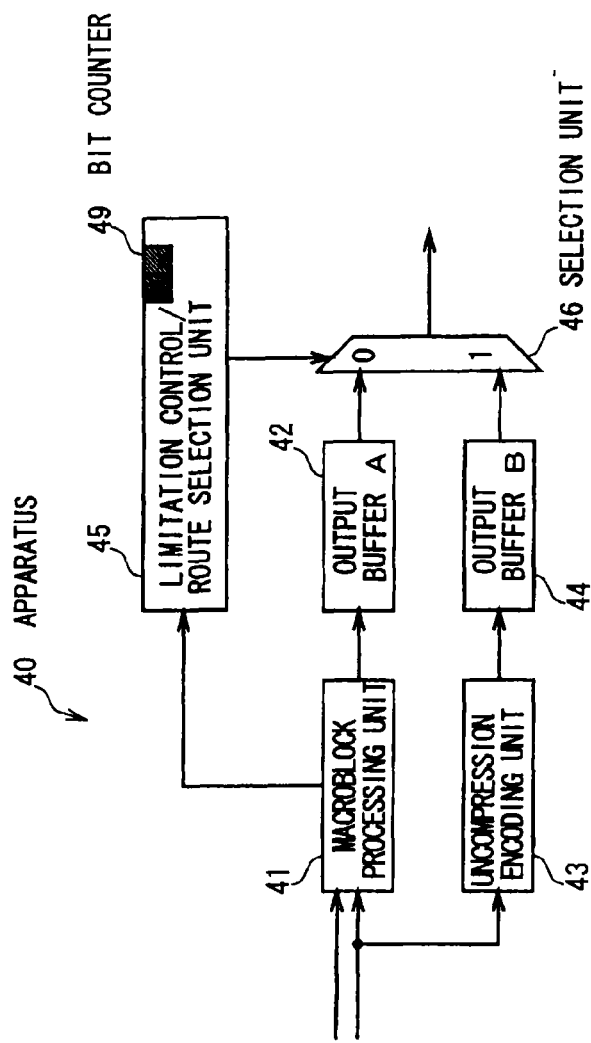
FIG. 3 shows an example of a construction of a video-information encoding apparatus of the present invention.

Next, FIG. 3 shows another embodiment of a video encoding apparatus of the present invention. In this embodiment, in addition to the embodiment of FIG. 1, a route for uncompressed encoded data, that is for encoding uncompressed raw data of an input macroblock, is provided.

What is different between the apparatus 40 of FIG. 3 and the apparatus 10 of FIG. 1 is that macroblock video data is input not only into a macroblock processing unit 41 but also into an uncompression encoding unit 43. The uncompression encoding unit 43 outputs data of input video information which is not subjected to a transform process and entropy coding, that is raw data to the output buffer B 44. A limitation control/route selection unit 45 manages the amount of data to be input to/output from the CABAC encoder by using the bit counter 49, and if the data being monitored exceeds a threshold value, the switcher 46 selects an input from the output buffer B 44 for output, similar to the limitation control unit 14 of FIG. 1. If the data does not exceed a threshold value, an output from either output buffer A 42 or output buffer B 44 can be selected.

In a case in which the limitation control/route selection unit 45 selects the output buffer B 44, that is raw data, the Context operation unit of the macroblock processing unit 41 is informed of this matter, and the state just before the processing of the macroblock which was processed as raw data is restored for the Context value of the Context operation unit, by using the Context value just before the macroblock was processed, which is stored in the Context memory group.

Also, in restoration of Context when the macroblock is processed as raw data, a predetermined initial state can be restored as well.

Data indicating whether a macroblock has been encoded as raw data or not is embedded into the header information of a bitstream to be output.

In a case in which raw data has been encoded, the CABAC encoding unit performs the terminal process before outputting the raw data as a bitstream.

In addition, the uncompression encoding unit 43 is not limited only to an uncompression encoding unit that outputs raw data, but can also be another type of compression unit such as a DPCM encoding unit.

Other operations of the apparatus 40 of FIG. 3 and variations of a unit of encoding are the same as the apparatus 10 of FIG. 1.

In this apparatus 40, the maximum amount of data to be input into/output from the CABAC encoding unit during encoding can be limited, so that a requested encoding processing time can be used satisfactorily. In addition, a bitstream that can be decoded within a requested processing time can be output.

Figure 4:
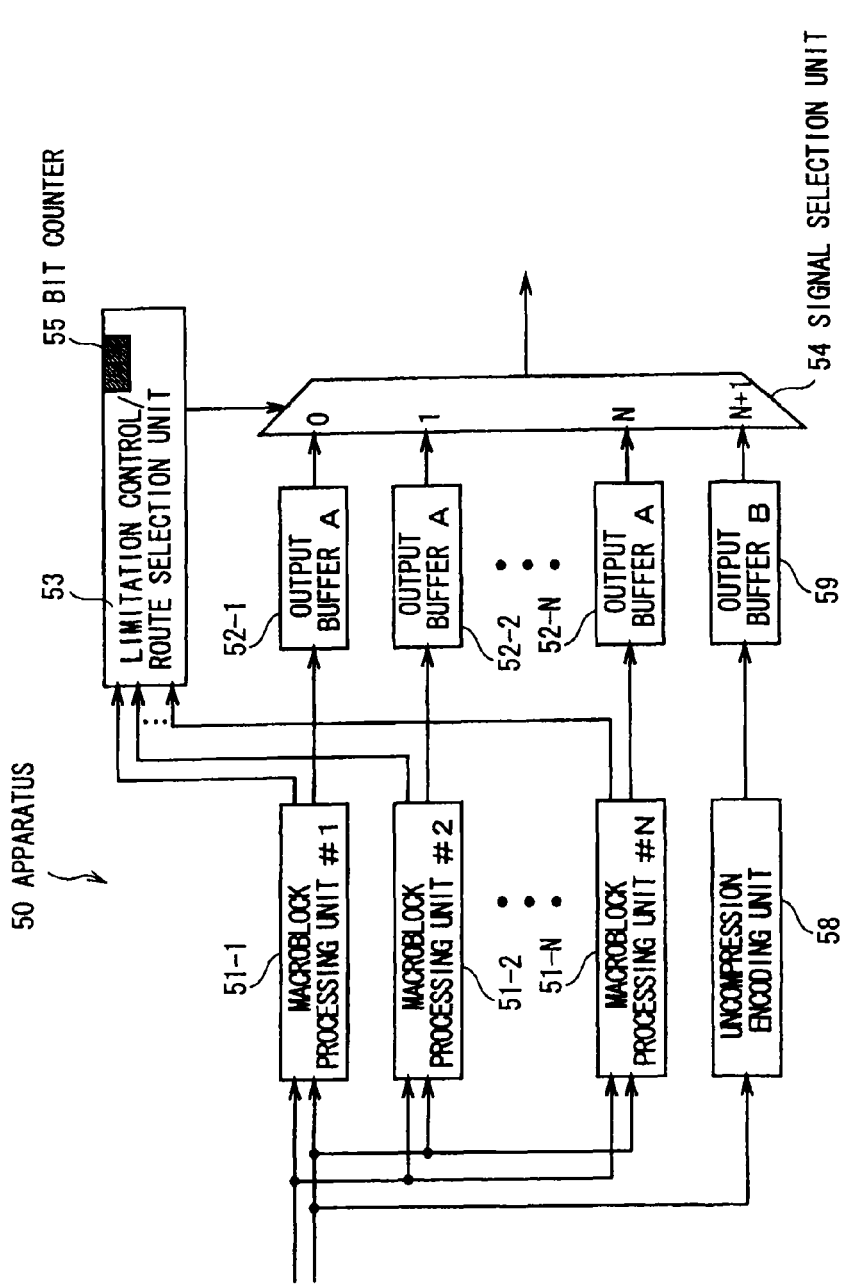
FIG. 4 shows an example of a construction of a video-information encoding apparatus of the present invention.

Next, FIG. 4 shows an apparatus 50 as another embodiment of a video encoding apparatus of the present invention. In this embodiment, in addition to the apparatus 30 of FIG. 2, a route for data to be uncompressed and encoded, that is for uncompressing and encoding raw data of input macroblock, is provided.

Since operations of the common units of the apparatus of FIG. 4 with the apparatus of FIG. 2 are almost the same as the apparatus of FIG. 1, only different operations will be described. In this embodiment macroblock video data is input not only to macroblock processing units 51-1 to 51-N but also to an uncompression encoding unit 58. The uncompression encoding unit 58 outputs data of input video information which is not subjected to a transform process and entropy coding, that is raw data, to an output buffer B 59. A limitation control/route selection unit 53 monitors a bit counter 55, as in the limitation control/route selection unit 34 of FIG. 2, and if a bit counter for all routes 1-N (any of two) exceeds a preset threshold value, a signal selection unit 54 selects and outputs an input from the output buffer B 59. And if the bit counter 55 does not exceed the threshold value, the signal selection unit 54 can select any of outputs from the output buffers A 52-1-A 52-N and the output buffer B 59.

Also, if the signal selection unit 54 selects raw data from the output buffer B 59, the state of Context just before a macroblock was processed, which is stored in the Context memory group, is restored as the state of Context of the Context operation units of the macroblock processing units 51-1 to 51-N. It should be noted that a predetermined initial value is able to be restored in this restoration, as described for the apparatus 10 of FIG. 1.

When the signal selection unit 54 selects an output buffer A 52-1 out of the output buffers A 52-1 to A 52-N, not raw data from the output buffer, on the contrary, the state of Context of the Context operation unit of the macroblock processing unit 51-1 is copied to the Context operation units of the other macroblock processing units 51-1 to 51-N. This is because all the states of the Context of the Context operation units should be the same for the time when encoding of a next macroblock starts. It should be noted that the uncompression encoding unit 58 is not limited to only an uncompression processing unit that outputs raw data, but can also be another type of compression unit such as a DPCM encoding unit.

Other detailed operations of the device 50 of FIG. 4 and variations of a unit of encoding are the same as the apparatus 10 of FIG. 1.

In this apparatus 50, the maximum amount of data to be input to/output from the CABAC encoding unit can be limited during encoding, so that a requested encoding processing time can be used satisfactorily. In addition, a bitstream which can be encoded within a requested processing time can be output.

Figure 5:
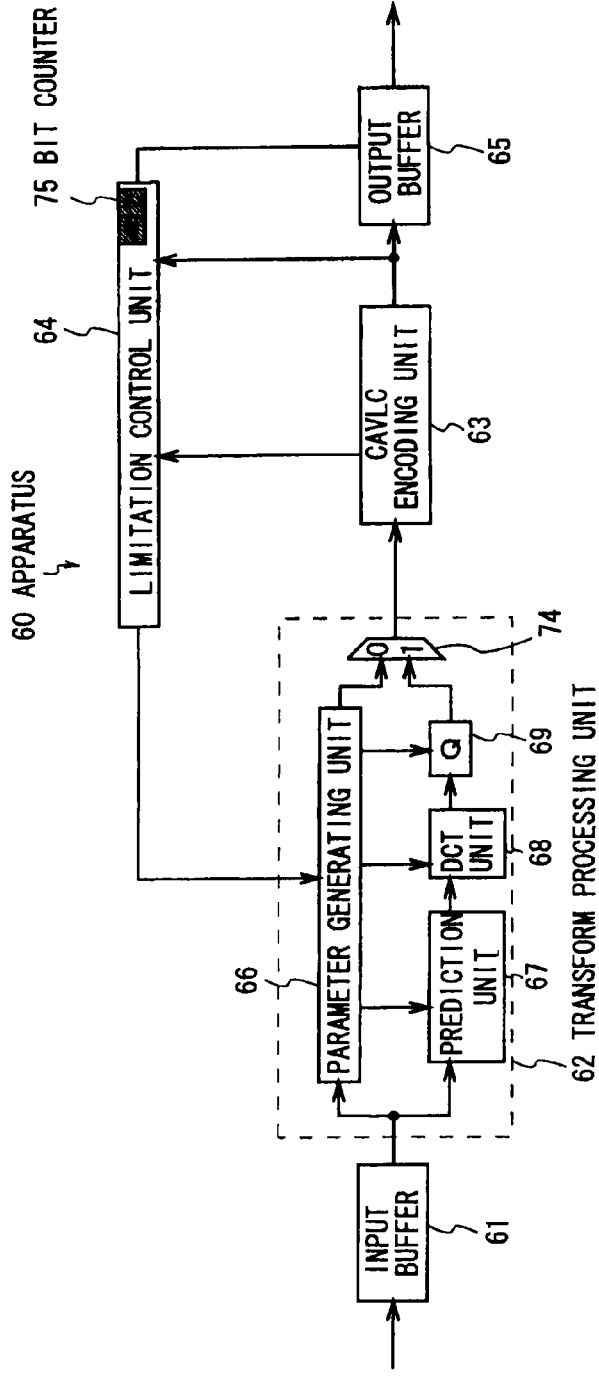
FIG. 5 shows an example of a construction of a video-information encoding apparatus of the present invention.
Figure 8:
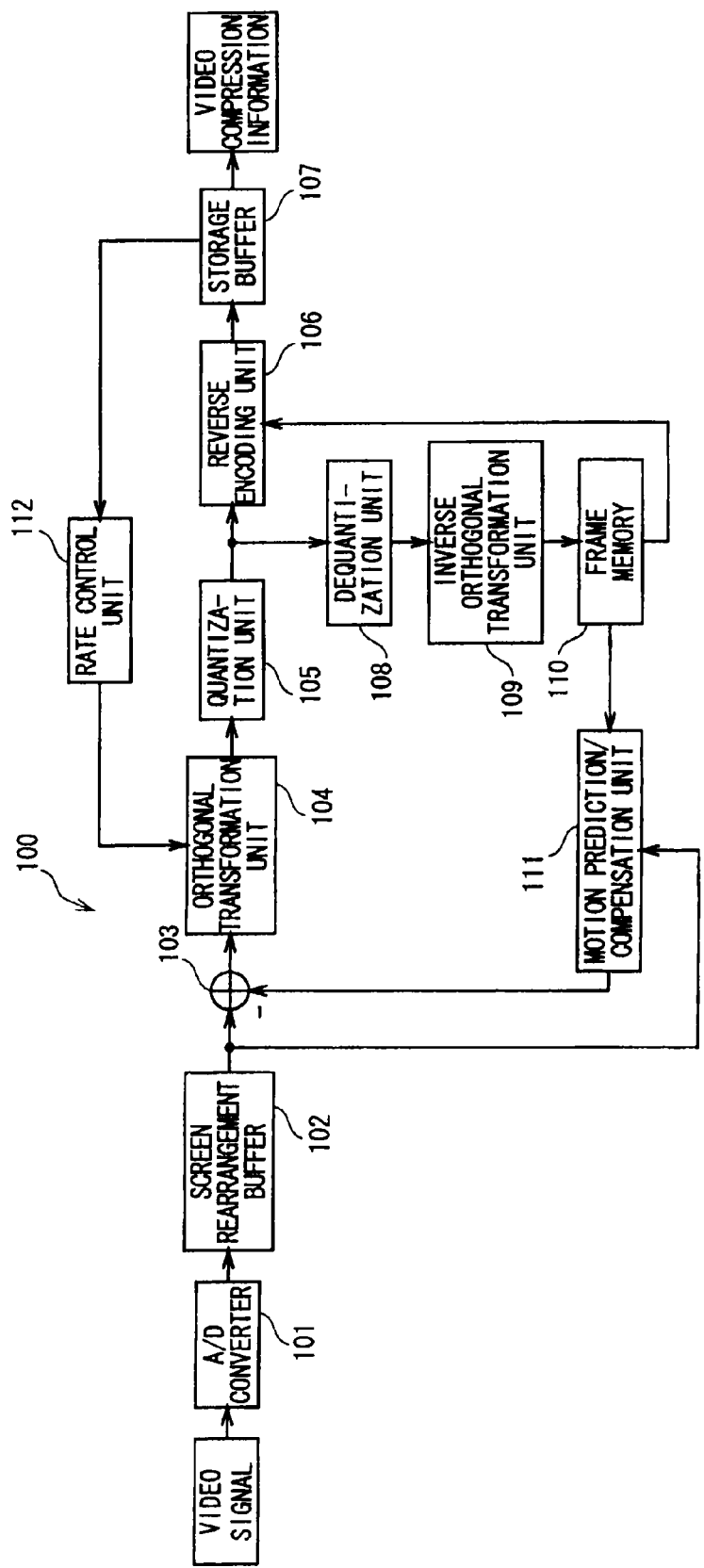
FIG. 8 shows an example of a construction of a background video-information encoding apparatus.
Figure 9:
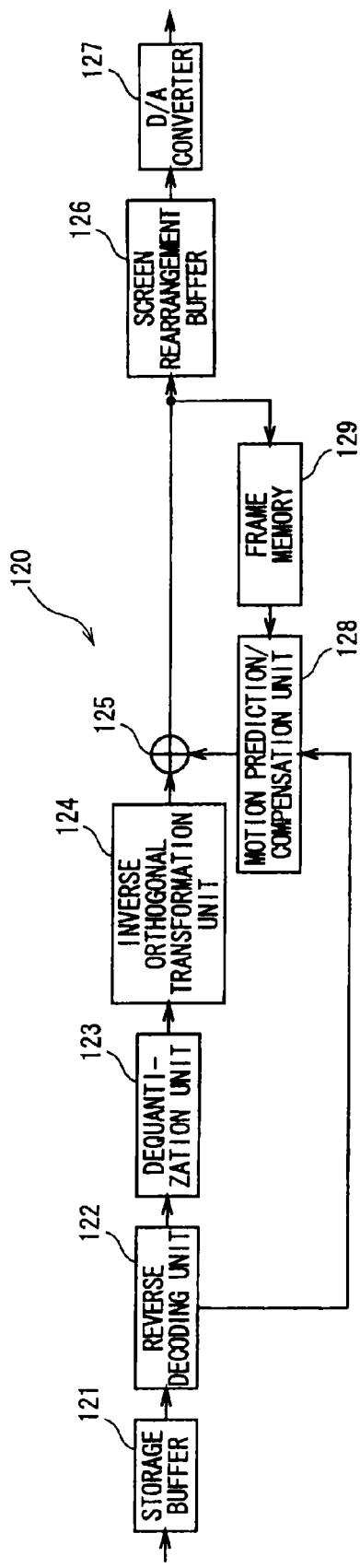
FIG. 9 shows an example of a construction of a background video-information decoding apparatus.
Figure 10:
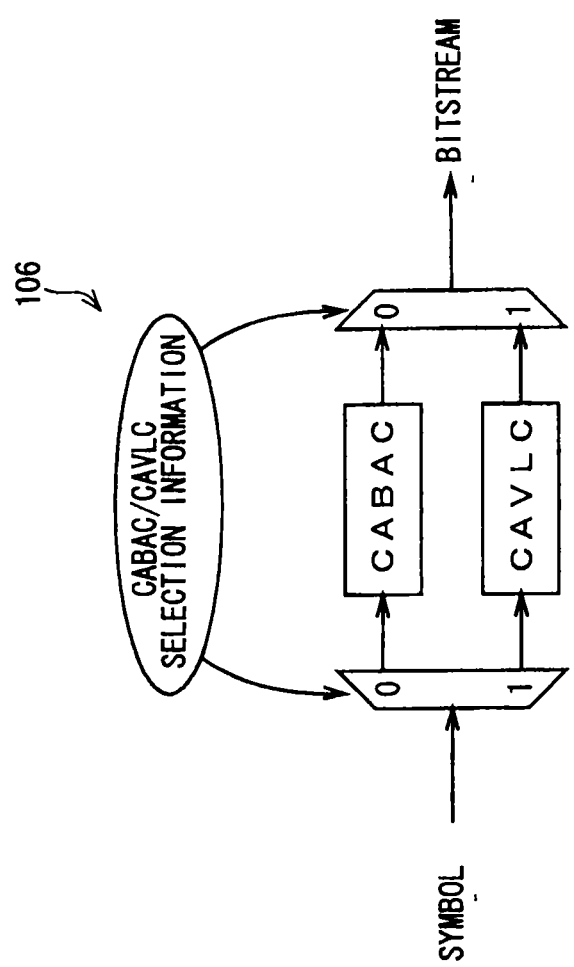
FIG. 10 shows an example of a construction of a variable-length coding unit in background JVT.

Next, FIG. 5 shows an apparatus 60 using CAVLC, not CABAC, as the reverse encoding unit 106 of FIG. 8. This apparatus 60 has a CAVLC processing unit 63, instead of the CABAC processing unit 13 of the apparatus 10 of FIG. 1, and performs the same operation, except for the CAVLC processing unit 63 and the limitation control unit 64. Therefore, only the operation of the CAVLC processing unit 63 and the limitation control unit 64 are described in this section.

Figure 12:
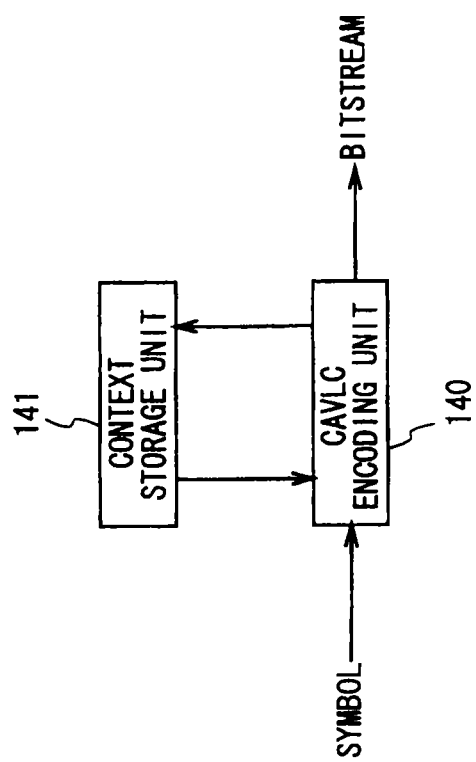
FIG. 12 shows an example of a construction of a CAVLC encoding unit in background JVT.
Figure 13:
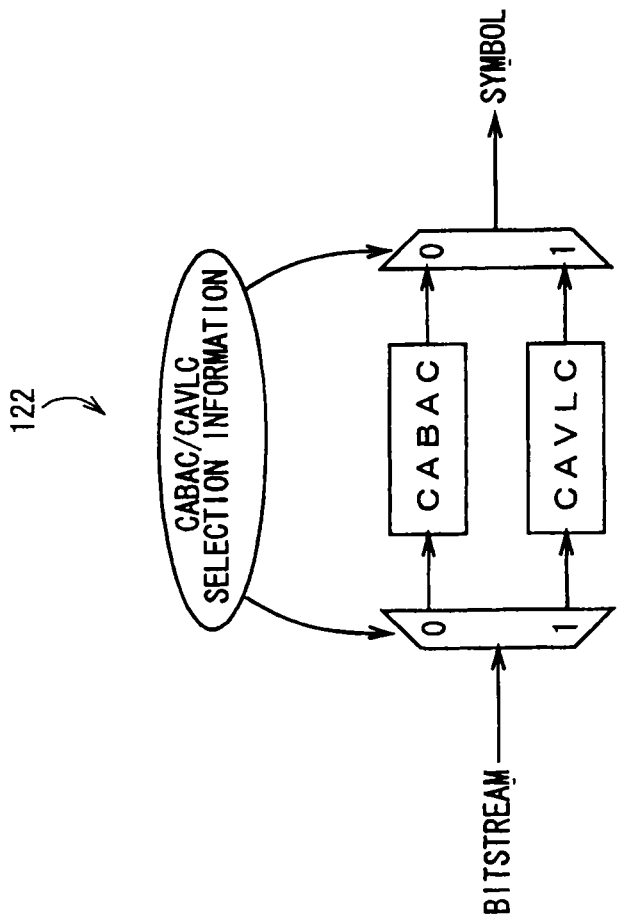
FIG. 13 shows an example of a construction of a variable-length decoding unit in background JVT.

In the CAVLC processing unit 63, header information and quantized coefficient information input as symbol data are variable-length encoded with a variable length table, similar to a conventional MPEG2, and are output as bit data. The CAVLC processing unit 63 is composed of the CAVLC encoding unit and the Context storage unit described for the background art in FIG. 12, and the CAVLC processing unit 63 of the present invention can store the state of Context just before a macroblock is encoded to restore the state just before the macroblock is encoded when a reencoding signal arrivals, in addition to storing information encoded by the CAVLC encoding unit, for example, the number of non-zero coefficients in each block of not only blocks being processed but also blocks already processed and a value of a coefficient encoded just before this time, as in the background storage unit. The CAVLC encoding unit can change a variable-length coding table to be applied to a symbol, on the basis of information from this Context storage unit. Note that, the Context storage unit stores the initial state of Context which is used for a reset.

The limitation control unit 64 has one counter (bit counter 75) for the number of pieces of bit data output from the CAVLC processing unit 63, and increases this counter by one every time the CAVLC processing unit 6 outputs bit data. This counter resets to zero when the processing of beginning of a macroblock starts. Therefore, the number of pieces of output data from the CAVLC processing unit 63 can be counted for each macroblock.

If this counter 75 exceeds a predetermined threshold value, the limitation control unit 64 outputs a signal (referred to as a "reencoding signal" hereinafter), indicating that the data to be encoded is invalid, to an output buffer 65 and a parameter setting unit 66. The parameter setting unit 66 that receives this reencoding signal re-sets an encoding parameter not to exceed the threshold value and performs reencoding on macroblock data to be encoded. In addition, the output buffer 65 that received the reencoding signal deletes all bit data of the macroblock to be encoded, being stored therein, and waits for macroblock data encoded with a new encoding parameter to be input.

Other detailed operations of the apparatus 60 of FIG. 5 and variations of a unit of encoding are the same as the apparatus 10 of FIG. 1.

In this apparatus 60, the maximum amount of data output from the CAVAL encoding unit can be limited for one-time macroblock processing, so that a requested macroblock processing time can be used satisfactorily. In addition, a bitstream which can be decoded within a requested processing time can be output.

Further, in not only the apparatus of FIG. 1 but also the apparatuses of FIG. 2 to FIG. 4, the CAVLC processing unit can be used instead of the CABAC processing unit and its operation is the same of that described now in this embodiment. However, if a macroblock is encoded as raw data, the CAVLC processing unit does not have Context for the macroblock, so that a method for updating Context when raw data is encoded should be defined. Various kinds of methods can be applied, provided that an encoding apparatus and a decoding apparatus are synchronized with each other. For example, the number of non-zero coefficients existing in blocks of a macroblock encoded as raw data can be taken to 15. In this apparatus, the maximum amount of data to be output from the CAVLC encoding unit can be limited during encoding, so that a requested encoding processing time can be used satisfactorily. In addition, a bitstream which can be decoded within a requested processing time can be output.

Figure 6:
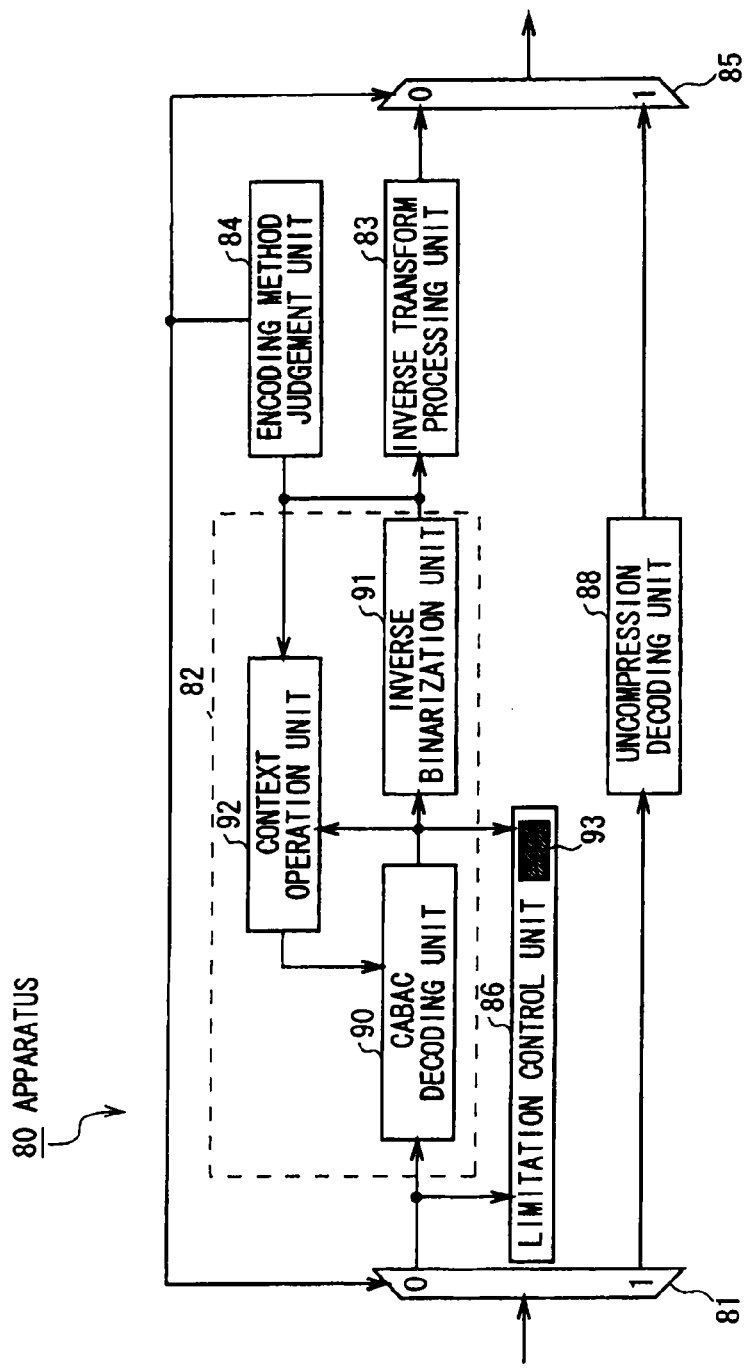
FIG. 6 shows an example of a construction of a video-information decoding apparatus of the present invention.

Next, FIG. 6 shows an apparatus 80 of a video-information decoding apparatus of the present invention corresponding to the apparatuses of FIG. 1 to FIG. 4. It should be noted that the apparatuses of FIG. 1 and FIG. 2 do not have an uncompression encoding unit and route for the unit, so that the apparatus 80 of FIG. 6 does not select a route to an uncompression decoding unit 88. In a case in which such a situation is clear, the uncompression decoding unit 88 and the route for the unit may not be provided.

In the apparatus 80 of FIG. 6, a bitstream to be decoded is input and a decoded video signal is output. The apparatus 80 of FIG. 6 is composed of route selection units 81, 85, an encoding method judgement unit 84, an inverse transform processing unit 83, a CABAC processing unit 82, a limitation control unit 86, and the uncompression decoding unit 88.

First, when processing of each macroblock starts, the route selection units 81, 85 select a route of the CABAC processing unit 82. The CABAC processing unit 82 decodes a symbol embedded into a bitstream, indicating whether a macroblock is raw data or not, before decoding the macroblock from the input bitstream, and if the encoding method judgement unit 84 judges that it is raw data, the route selection units 81, 85 select a route of the uncompression decoding unit 88, to output the output from the uncompression decoding unit 88 as a video signal. At this time, the uncompression decoding unit 88 obtains video data through fixed-length decoding. If the uncompression encoding unit 88 is selected, the state of Context of the Context operation unit 92 of the CABAC processing unit 82 may not be changed, may be initialized with a predetermined value, or may be changed with another rule, provided that it is synchronized with the operation of the CABAC processing unit on an encoding apparatus side. In addition, at this time, a predictor used for decoding a macroblock in the same picture to be decoded later is set to a predetermined value. For example, the motion vector of a macroblock uncompression-decoded is set to 0, and a macroblock type is set to an intra-encoding. This predictor value may have any value, provided that it is synthesized with an encoding apparatus side.

If the encoding method judgement unit 84 selects that macroblock data is processed by the CABAC processing unit 82, an input bitstream is input into the CABAC processing unit 82 successively.

The CABAC processing unit 82 decodes and outputs header information and quantized coefficient information from an input bitstream, as symbol data. Specifically, the input bitstream is entropy-decoded by the CABAC decoding unit 90 based on Context information from the Context operation unit 92, and the output binary symbol string is transformed into symbol data by the inverse binarization unit 91. The Context operation unit 92 updates Context based on the binary data input into the inverse binarization unit 91 and symbol data output from the inverse binarization unit 91, and outputs the Context information to the CABAC decoding unit 90. The operation of the CABAC processing unit 88 is under description of section 9.2 of JVT FCD noted in the background art.

The inverse transform processing unit 83 performs dequantization, inverse DCT, and motion compensation on input header information and quantized coefficient information, to decode and output video signals.

The limitation control unit 86 has a first counter for the number of pieces of bit data to be input into the CABAC decoding unit 90 and a second counter for the number of pieces of binary data output (bit counter 13), and increases the first counter by one every time bit data is input into the CABAC decoding unit 90, and increases the second counter by one every time binary data is output from the CABAC decoding unit 90. These counters reset to zero when the processing of the beginning of the macroblock starts. Thereby, the number of pieces of input data and output data of each macroblock in/from the CABAC decoding unit 90 can be counted.

If any of these counters exceeds a preset threshold value, the limitation control unit 86 performs error processing. This error processing can stop a decoding process once and start the decoding process again after a slice header or picture header arrives, or can only make a warning and keep the decoding process going. In addition, the decoding process can be kept without the error processing.

In this apparatus 80, the amount of data to be input into/output from the CABAC decoding unit 90 during decoding can be controlled, so that even the amount of data exceeding the maximum amount of data is input or output, the error processing or the like can be performed to use a requested decoding processing time satisfactorily.

In addition, the limitation control unit 86 is not necessarily mounted in the apparatus 80. In this case, the amount of data input and output is not monitored in the CABAC encoding unit 90.

Also, although the apparatus 80 shows an embodiment of a video information decoding apparatus of the present invention in a case in which CABAC is applied as entropy decoding, the CAVLC processing unit can be used instead of the CABAC processing unit as shown in the embodiment for a video encoding apparatus. The description for its actual processes will be omitted because the apparatus are very similar, as described in an embodiment for an encoding apparatus. Note that, similarly to the encoding apparatus, a method of updating Context in CAVLC for a case in which macroblock is encoded as raw data is previously defined.

Next, an embodiment of a bitstream encoded according to the present invention will be shown. As described so far, both data compressed in a bitstream and raw data can be encoded in the present invention. Therefore, header information indicating whether the macroblock has been encoded as raw data or not is added, which is followed by raw data or compressed bit data. The information indicating whether a macroblock has been encoded as raw data or not is different depending on a macroblock type that is one of macroblock header information. Conversely, a bitstream in the present invention can include macroblocks processed in different encoding methods.

Further, this specification shows a case in which information specifying the encoding method applied to a macroblock is added as header information of the macroblock. If this specification information is added in a slice header or a picture header, encoding methods can be mixed and the encoding methods can be specified on a slice or picture basis.

If header information (for example, macroblock type) is encoded by CABAC and the raw data (that is, a fixed-length bit string) is encoded, a bit subjected to the terminal process of the CABAC is inserted in a bitstream of the present invention before the raw data is encoded.

Further, in a case in which a bitstream is encoded by CABAC, the bitstream is composed of data that does not make any bit counter for input and output of the CABAC encoding unit and decoding unit exceed a preset threshold value preset. In addition, in a case in which the bitstream is encoded, the bitstream is composed of data that does not make any bit counter for output of CAVLC encoding unit and input of decoding unit exceed a preset threshold value. As a result, with bitstreams of the present invention, a video-information encoding apparatus and a video-information decoding apparatus have a guarantee of a fixed decoding processing time.

By limiting the amount of data to be input to/output from a CABAC encoding unit and decoding unit and by encoding uncompressed data, a video-information encoding apparatus and decoding apparatus have a guarantee of a fixed processing time, thus making it possible to realize a device with a guarantee of the processing time. In addition, the same effects can be obtained in a case in which CAVLC is used instead of CABAC.

The invention claimed is:

1. A video encoding apparatus for encoding a video signal, comprising:
    encoding means for performing an arithmetic encoding process using a context value on the video signal and generating a bit stream including raw data of the video signal in a unit of encoding;
    determining means for determining if the unit of encoding in the bit stream is encoded as the raw data; and
    controlling means for, when the determining means determines that the unit of encoding includes the raw data, controlling the arithmetic encoding process so as to terminate the arithmetic encoding process for the unit of encoding that includes the raw data, for maintaining a context value previously used in the arithmetic encoding process for a unit of encoding immediately before the unit of encoding that includes the raw data of the video signal, and for inserting a bit subjected to a terminal process of the arithmetic encoding process into the bit stream.

2. A video encoding method for encoding a video signal, comprising:
    performing an arithmetic encoding process using a context value on the video signal and generating a bit stream including raw data of the video signal in a unit of encoding;
    determining if the unit of encoding in the bit stream is encoded as the raw data; and
    controlling, when the determining determines that the unit of encoding includes the raw data, the arithmetic encoding process so as to terminate the arithmetic encoding process for the unit of encoding that includes the raw data, maintaining a context value previously used in the arithmetic encoding process for a unit of encoding immediately before the unit of encoding that includes the raw data of the video signal, and inserting a bit subjected to a terminal process of the arithmetic encoding process into the bit stream.

3. A video encoding apparatus for encoding a video signal, comprising:
    an encoder configured to perform an arithmetic encoding process using a context value on the video signal and to generate a bit stream including raw data of the video signal in a unit of encoding;
    a determining unit configured to determine if the unit of encoding in the bit stream is encoded as the raw data; and
    a controller, including a processor, configured to control, when the determining unit determines that the unit of encoding includes the raw data, the arithmetic encoding process so as to terminate the arithmetic encoding process for the unit of encoding that includes the raw data, to maintain a context value previously used in the arithmetic encoding process for a unit of encoding immediately before the unit of encoding that includes the raw data of the video signal, and to insert a bit subjected to a terminal process of the arithmetic encoding process into the bit stream.

4. The video encoding apparatus according to claim 3, wherein the controller reuses a same context value used in the arithmetic encoding process for the unit of encoding immediately before the unit of encoding that includes the outputting raw data of the video signal for a unit of encoding immediately after the unit of encoding that includes the outputting raw data of the video signal.

* * * * *